United States Patent
Law

(10) Patent No.: US 11,434,019 B2
(45) Date of Patent: Sep. 6, 2022

(54) FUEL EXTRACTION SYSTEM, FUEL TANK APPARATUS HAVING A FUEL EXTRACTION SYSTEM, AND FUEL CELL SYSTEM HAVING A FUEL EXTRACTION SYSTEM

(71) Applicant: Airbus Operations GmbH, Hamburg (DE)

(72) Inventor: Barnaby Law, Hamburg (DE)

(73) Assignee: AIRBUS OPERATIONS GMBH, Toulouse (FR)

( * ) Notice: Subject to any disclaimer, the term of this patent is extended or adjusted under 35 U.S.C. 154(b) by 355 days.

(21) Appl. No.: 16/826,977

(22) Filed: Mar. 23, 2020

(65) Prior Publication Data

US 2020/0309324 A1   Oct. 1, 2020

(30) Foreign Application Priority Data

Mar. 29, 2019   (DE) .................... 10 2019 108 158.0

(51) Int. Cl.
  *B64D 37/10*   (2006.01)
  *F17C 7/02*   (2006.01)
  (Continued)

(52) U.S. Cl.
  CPC ............. *B64D 37/10* (2013.01); *B64D 37/18* (2013.01); *B64D 37/24* (2013.01); *F17C 5/06* (2013.01);
  (Continued)

(58) Field of Classification Search
  CPC ........ B64D 37/10; B64D 37/14; B64D 37/18; B64D 37/20; B64D 37/24; F17C 5/06;
  (Continued)

(56) References Cited

U.S. PATENT DOCUMENTS 5,183,074 A * 2/1993 Reese .................. G05D 16/163
                                                            137/488
7,037,609 B2 * 5/2006 Sugawara ......... H01M 8/04097
                                                            429/415

(Continued)

FOREIGN PATENT DOCUMENTS

DE       19910893 A1    9/2000
DE       10021681 A1   11/2001
WO     2005003621 A1    1/2005

OTHER PUBLICATIONS

German Search Report; priority document.

*Primary Examiner* — Nicolas A Arnett
(74) *Attorney, Agent, or Firm* — Greer, Burns & Crain, Ltd.

(57) ABSTRACT

A fuel extraction system for extracting a gaseous fuel from a fuel tank. The fuel extraction system includes a conveying device which is configured to convey gaseous fuel and to bring it from a first pressure level to a second pressure level, a first line which is configured to connect the conveying device fluidically to the interior of the fuel tank, a buffer tank which is configured to store the fuel at the second pressure level, and which has a first outlet and a second outlet, at least one valve with a pneumatic actuating device, and a second line which is connected to the first outlet of the buffer tank and is configured to conduct a part of the fuel at the second pressure level to the pneumatic actuating device of the at least one valve. Furthermore, a fuel tank apparatus and a fuel cell system are described.

12 Claims, 1 Drawing Sheet

(51) Int. Cl.
*H01M 8/04082* (2016.01)
*F17C 5/06* (2006.01)
*F17C 9/02* (2006.01)
*B64D 37/24* (2006.01)
*B64D 37/18* (2006.01)

(52) U.S. Cl.
CPC ............... *F17C 7/02* (2013.01); *F17C 9/02* (2013.01); *H01M 8/04201* (2013.01); *F17C 2221/012* (2013.01); *F17C 2227/0157* (2013.01); *F17C 2227/03* (2013.01); *F17C 2250/01* (2013.01); *F17C 2270/0184* (2013.01); *F17C 2270/0189* (2013.01); *H01M 2250/20* (2013.01)

(58) Field of Classification Search
CPC ........ F17C 7/02; F17C 9/02; F17C 2221/012; F17C 2227/0157; F17C 2227/03; F17C 2250/01; F17C 2270/0184; F17C 2270/0189; H01M 8/04201; H01M 2250/20

See application file for complete search history.

(56) References Cited

U.S. PATENT DOCUMENTS

| | | | |
|---|---|---|---|
| 7,547,481 B2* | 6/2009 | Sugawara | H01M 8/04097 429/413 |
| 7,687,170 B2* | 3/2010 | Ushio | H01M 8/04179 429/413 |
| 7,976,990 B2* | 7/2011 | Ballantine | H01M 8/249 429/408 |
| 8,399,140 B2* | 3/2013 | Takagi | H01M 8/04228 429/513 |
| 8,920,988 B2* | 12/2014 | Knoop | H01M 8/04097 429/415 |

* cited by examiner

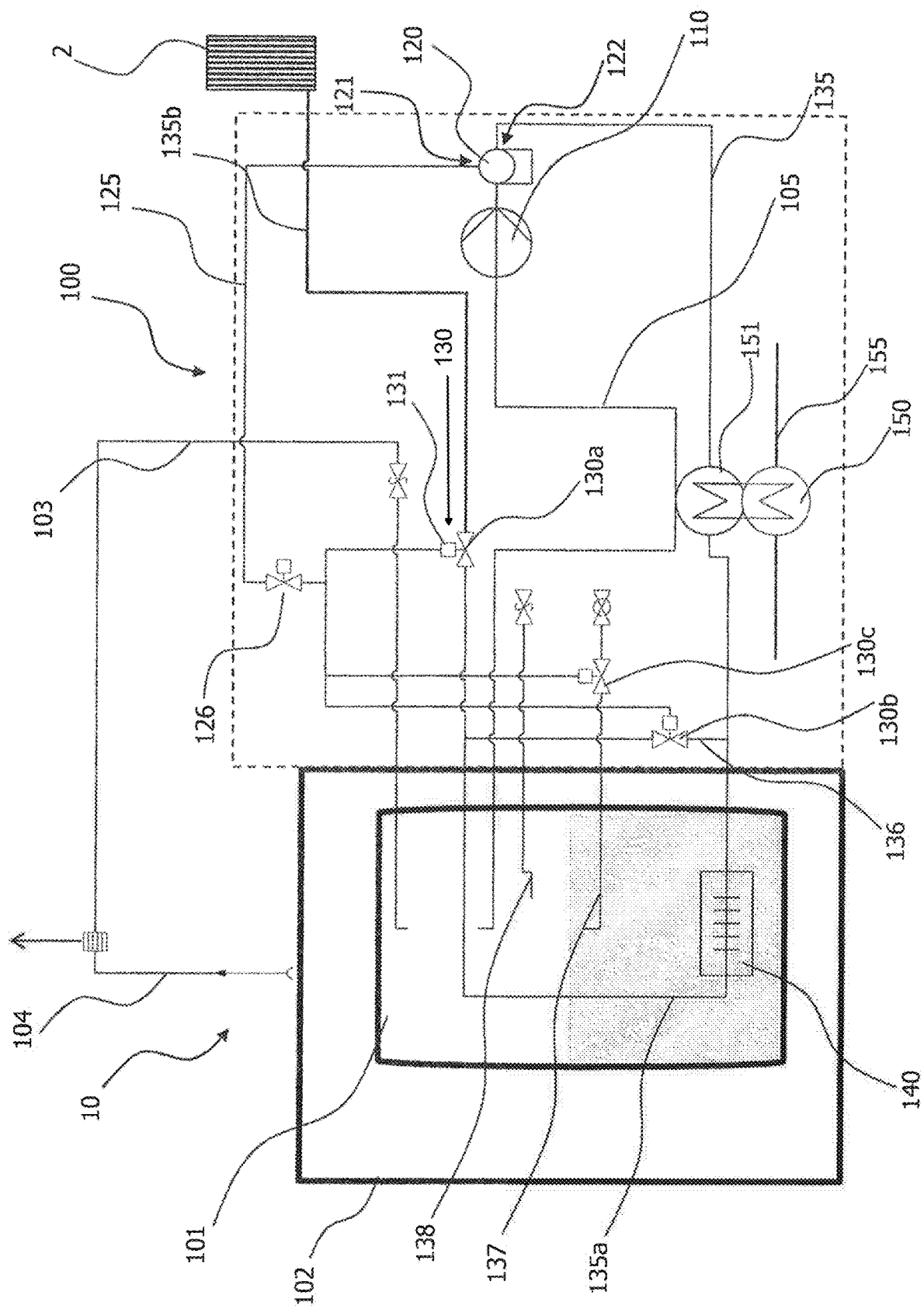

FUEL EXTRACTION SYSTEM, FUEL TANK APPARATUS HAVING A FUEL EXTRACTION SYSTEM, AND FUEL CELL SYSTEM HAVING A FUEL EXTRACTION SYSTEM

CROSS-REFERENCES TO RELATED APPLICATIONS

This application claims the benefit of the German patent application No. 10 2019 108 158.0 filed on Mar. 29, 2019, the entire disclosures of which are incorporated herein by way of reference.

FIELD OF THE INVENTION

The invention relates to a fuel extraction system, to a fuel tank apparatus and a fuel cell system, in each case with a fuel extraction system. In particular, the invention relates to a fuel extraction system, and to a fuel tank apparatus and a fuel cell system with a fuel extraction system which conveys gaseous fuel from a fuel tank, brings it to a higher pressure level, and, in this way, actuates a valve with a pneumatic actuating device.

BACKGROUND OF THE INVENTION

Conventional fuel cell systems are designed to convey gaseous and/or liquid fuel, such as hydrogen, via lines. The lines can be provided with pneumatic or electromagnetic valves, in order to control a throughflow quantity of the fuel through the corresponding line. A pneumatic system or an electric circuit is necessary for the operation of the pneumatic or electromagnetic valves. In aircraft, for example, either existing pneumatic systems or electric circuits have been used for this purpose and the actuating device of the valves has been connected thereto, or pneumatic systems or electric circuits which are provided specifically for the fuel cell system have been installed. As a result, however, the power requirement of the respective aircraft system and the weight for additional systems are increased.

SUMMARY OF THE INVENTION

The invention is based on an object of providing a fuel extraction system, a fuel tank apparatus and a fuel cell system which can be controlled more simply and, in the process, can be configured in a manner which saves more weight.

In accordance with a first aspect for improved comprehension of the present disclosure, a fuel extraction system for extracting a gaseous medium from a fuel tank comprises a conveying device which is set up to convey gaseous fuel and to bring it from a first pressure level to a second pressure level, and a first line which is set up to connect the conveying device fluidically to the interior of the fuel tank.

The conveying device can be configured, for example, in the form of a compressor, a fan or a pump for gases. By way of the conveying device which can increase the pressure level of the gaseous fuel, it is possible to store the fuel at a lower pressure level in the fuel tank, that is to say, at the first pressure level. For example, the fuel can be hydrogen for a fuel cell. This is usually stored at approximately from 6 to 10 bar, in order to be conducted at a corresponding pressure level to the fuel cell, it being necessary for pressure losses on account of line routing, valves, etc. to be taken into consideration. By way of the conveying device, the fuel can then be stored at a lower pressure level, for example from 1 to 4 bar, preferably from 1 to 3 bar, and particularly preferably at 2 bar. This allows a simpler structure of the fuel tank, as a result of which the latter can be configured in a lighter manner which therefore saves more weight. The conveying device can be designed, in the case of fuel in the form of hydrogen, to raise it from the first pressure level in the fuel tank to the second pressure level of approximately from 15 to 22 bar, preferably from 18 to 21 bar, and particularly preferably 20 bar.

Furthermore, the fuel extraction system can comprise a buffer tank which is set up to store the fuel at the second pressure level, and which has a first outlet and a second outlet. In addition, the fuel extraction system can comprise at least one valve with a pneumatic actuating device and a second line which is connected to the first outlet of the buffer tank and is set up to conduct a part of the fuel at the second pressure level to the pneumatic actuating device of the at least one valve. In this way, a valve/valves of the fuel extraction system is/are operated by way of fuel, as a result of which the connection to a separate pneumatic system is not necessary. Furthermore, an already existing pneumatic system does not have to be adapted for the actuation of the valves of the fuel extraction system, as was the case in conventional fuel extraction systems in aircraft. Weight can be saved as a result, since lines of an existing pneumatic system do not have to be extended as far as the installation location of the fuel extraction system, and a pressure-generating unit in the pneumatic system also does not have to be designed for higher loading (maximum overall loading). For example, a compressor which is operated in an aircraft has to achieve a very high compression ratio, since a very low ambient pressure prevails during the flight phase, and a high actuating pressure is necessary for operating the valves in a fuel extraction system.

Although the buffer tank has to be designed to store the fuel at the higher second pressure level, since the buffer tank has to be designed only for a fuel quantity which is sufficient for actuating the at least one valve and/or for operating a connected fuel cell, the buffer tank can be of considerably smaller dimensions than the fuel tank. It is sufficient, for example, to provide a buffer tank for intermediate storage of approximately from 10 to 50 g of gaseous fuel, preferably from 15 to 30 g, and particularly preferably 20 g of gaseous fuel. Furthermore, the size of the buffer tank can also be designed in a manner which is dependent on the power output of a connected fuel cell, for example for intermediate storage of approximately from 10 to 50 g per 100 kW of system power output, preferably from 15 to 30 g per 100 kW, and particularly preferably 20 g per 100 kW. As a result, in the case of the fuel tank which no longer has to be designed for high pressures, the weight saving is counteracted from scarcely to not at all. Furthermore, the buffer tank does not have to be designed to store fuel at the second pressure level for a relatively long time period, for example during phases, in which the fuel extraction system is not in operation, but rather merely has to store fuel for the time of the operation of the fuel extraction system. In other words, the buffer tank does not have to be configured and secured in such a way that it stores the fuel for a long time and safely, as in the case of a customary fuel tank. The buffer tank can thus also be emptied when the fuel extraction system is not in operation or is switched off. For example, the fuel which is stored in the buffer tank at the second pressure level can be conducted back into the fuel tank easily on account of the higher pressure level.

In one design variant, the pneumatic actuating device of the at least one valve can be set up to open and to close the valve exclusively by means of the fuel at the second pressure level. In other words, the fuel at the second pressure level is present in a sufficient quantity and at a sufficiently high pressure in the buffer store, in order to move the at least one valve between an open position and a closed position or a partially open position which lies in between. The actuating device for the at least one valve therefore does not have to comprise any additional actuating elements, such as springs, electromagnetic actuators, etc. In addition, a pneumatic actuating device of the at least one valve is the more reliable variant, for example in comparison with electromagnetically operated valves. Thus, for example, electromagnetically operated valves have to have a motor drive or the like, which operates reliably at very low temperatures, that is to say, has rapid and reliable closing and opening times.

In a further design variant, the fuel extraction system can comprise a third line which is connected to the second outlet of the buffer tank and is set up to conduct the fuel at the second pressure level to a consumer. The consumer can be an engine, a fuel cell or another machine which converts the energy of the fuel into electric energy, kinetic energy and/or heat. If the consumer is a fuel cell, it requires hydrogen at a pressure level of approximately 2 bar (2 bar±0.5 bar), which is provided by the conveying device (via the buffer tank). Therefore, the fuel can be stored in the fuel tank at the first, lower pressure level, independently of pressure losses in lines, valves, etc. between the fuel tank and the consumer.

In yet another design variant, the third line can have a section which leads through the interior of the fuel tank and which comprises a heat exchanger for evaporating liquid fuel in the fuel tank. On account of the increase of the pressure of the fuel to the second pressure level, a defined quantity of energy is fed to the fuel. For example, the gaseous fuel is also heated while it is being compressed by way of the conveying device. Therefore, the fuel which is extracted from the fuel tank and is raised to the second level can be used as a heat source in the fuel tank, in order to evaporate liquid fuel there. The fuel in the third line can thus provide a sublimation energy input in the fuel tank. For example, in the case of hydrogen as fuel, this can be heated by way of the conveying device during raising from the first pressure level in the fuel tank to the second pressure level in the buffer tank by approximately 5 K. The thermal energy is usually sufficient to evaporate liquid hydrogen in the fuel tank.

As an alternative or in addition, a separate heat exchanger of a separate cooling circuit can also be arranged in the interior of the fuel tank, which separate heat exchanger outputs thermal energy into the liquid fuel, in order to introduce sublimation energy there.

In another design variant, a first valve of the at least one valve can be arranged in the third line downstream of the section through the interior of the fuel tank, and can be set up to regulate a throughflow quantity of the fuel through the third line. In other words, the first valve regulates the fuel quantity which is fed to the consumer. For this purpose, the fuel extraction system does not require any components of another system, for example of a pneumatic or electric system. As a result, the fuel extraction system can also be produced in a very compact manner which therefore saves further weight. Retrofitting or the replacement of the fuel extraction system can also be carried out rapidly and simply on account of its compactness.

In one optional refinement, the first valve can be a pressure reduction valve. For example, the first valve can keep the gaseous fuel upstream of the first valve at the second pressure level, whereas a third pressure level is set downstream of the first valve in the third line. For example, the first valve can reduce the pressure of the gaseous fuel to approximately from 8 to 12 bar, preferably from 9 to 11 bar, and particularly preferably 10 bar. This corresponds to a customary pressure of the fuel in fuel cell systems. The gaseous fuel in the lines of the fuel extraction system, in particular the second and third line, can therefore be held at the second pressure level, as a result of which a liquefaction of the fuel is prevented. Even if the fuel extraction system is intermittently out of operation, the fuel in the lines can be held at the second pressure level and can therefore be protected against liquefaction, as a result of which components which lie downstream, such as lines, valves, etc., are not damaged by way of liquid fuel.

In another design variant, furthermore, the fuel extraction system can comprise a bypass line which, outside the fuel tank, bypasses the section of the third line through the interior of the fuel tank, and a second valve of the at least one valve which is arranged in the bypass line and is set up to regulate a throughflow quantity of the fuel through the bypass line. The input of heat into the fuel tank can be controlled by way of the bypass line. Thus, by way of opening of the second valve, fuel at the second pressure level can be conducted past the fuel tank, with the result that less energy (thermal energy) is introduced via the first heat exchanger in the section of the third line through the interior of the fuel tank into the (liquid) fuel. The control of the throughflow quantity by way of the bypass line likewise takes place via a valve which has a pneumatic actuation means which, in turn, is operated by way of the fuel at the second pressure level from the second line. Therefore, no additional systems for actuating the second valve (bypass valve) are necessary for the bypass line and its operation.

In yet a further design variant, the fuel extraction system can comprise a second heat exchanger which is set up to utilize the gaseous fuel as a heat sink for a coolant of a cooling circuit. The second heat exchanger can be arranged, for example, in the first line, second line and/or third line. The fuel, in particular in the case of hydrogen, usually has a very low temperature level, as a result of which it is highly suitable for serving as a heat sink of a cooling system. In addition, liquefaction of the fuel in the corresponding line is prevented and/or the pressure level is increased further via the input of thermal energy into the fuel, as a result of which no additional conveying devices as far as the consumer are necessary. For example, the second heat exchanger can be arranged in the third line between the second outlet of the buffer tank and the section of the third line through the interior of the fuel tank. Therefore, the thermal energy which is absorbed via the second heat exchanger can be output via the first heat exchanger to the (liquid) fuel in the fuel tank. As an alternative or in addition, the first heat exchanger can also be arranged in the first line. As a result, the gaseous fuel in the first line is heated and its pressure level is already raised, as a result of which the conveying device requires less work for raising the pressure of the fuel to the second pressure level.

The cooling circuit can be, for example, a cooling circuit of a fuel cell system, the fuel extraction system being part of the fuel cell system. In other words, the waste heat which is generated in the fuel cell of the fuel cell system is used for operating the fuel extraction system. The coolant in the cooling circuit of a fuel cell system can have a temperature of approximately from 60 to 90° C., whereas stored hydrogen as fuel has a temperature of approximately from −240 to −250° C. (approximately from 20 to 30 K) and therefore represents a very satisfactory heat sink.

As an alternative or in addition, furthermore, the fuel extraction system can comprise a third heat exchanger which is set up to couple the gaseous fuel in the first line thermally to the gaseous fuel in the third line. Here, the gaseous fuel in the first line can be raised to the temperature level, since the gaseous fuel in the third line also has a higher temperature than the fuel in the first line on account of the raising to the second pressure level by way of the conveying device. This prevents liquefaction of the fuel in the first line or makes evaporation of residues of liquid fuel in the first line possible, before it is fed to the conveying device. As a result, damage to the conveying device by way of liquid fuel can be prevented. In accordance with one variant, the first heat exchanger and the third heat exchanger are combined in a common component, with the result that the fuel in the first line, the fuel in the third line and the coolant in the cooling circuit are coupled thermally among one another.

In a further design variant, the fuel extraction system can comprise a main valve which is arranged in the second line and which is set up to regulate a throughflow quantity of the fuel at the second pressure level through the second line. The main valve therefore regulates the inflow of fuel at the second pressure level to the pneumatic actuation means of the at least one valve. By way of closure of the main valve, the operation of the fuel extraction system can be set. For example, each of the at least one valve can be configured in such a way that it is always situated in the closed state in a rest position (for example, by means of a mechanical spring or the like). The pneumatic actuation means then serves to open the valve as far as the desired degree of opening. It goes without saying that each of the at least one valve can also be configured in such a way that the fuel at the second pressure level is used for pneumatic actuation both for opening and closing the valve.

In accordance with a further aspect for improved comprehension of the present disclosure, a fuel tank apparatus comprises a fuel tank for storing a fuel in a liquid and/or gaseous state, and a fuel extraction system in accordance with the first aspect. Here, the first line can have an opening, for example, in an upper (in the installed state of the fuel tank) section of the fuel tank, in order to conduct gaseous fuel through the first line to the conveying device. The first heat exchanger which is arranged in the interior of the fuel tank can, in turn, be provided in a lower (in the installed state of the fuel tank) section of the fuel tank, for example in a sump of the fuel tank, in order to be surrounded by liquid fuel.

In one design variant, furthermore, the fuel tank apparatus can comprise a feed line into the fuel tank for filling the fuel tank with liquid fuel, and a third valve of the at least one valve which is arranged in the feed line and is set up to regulate a throughflow quantity of the fuel through the feed line. As a result, the fuel tank apparatus can be filled with liquid fuel even during operation. No additional system is required for controlling the liquid fuel which is conducted into the fuel tank. Merely the conveying device of the fuel extraction system has to be operated, in order to actuate the third valve pneumatically.

In accordance with a further aspect for improved comprehension of the present disclosure, a fuel cell system comprises a fuel cell which is operated by way of gaseous fuel, and a fuel extraction system in accordance with the first aspect. As an alternative or in addition, the fuel cell system can comprise a fuel tank apparatus in accordance with the further (second) aspect.

In accordance with yet a further aspect for improved comprehension of the present disclosure, an aircraft comprises a fuel extraction system, a fuel tank apparatus and/or a fuel cell system in accordance with the preceding aspects.

It goes without saying that the above-described aspects, refinements and variants can be combined without this being described explicitly. Each of the described design variants can therefore be considered optionally in respect of each of the aspects, refinements and variants or even combinations thereof. The present disclosure is therefore not restricted to the individual refinements and design variants in the described sequence or a defined combination of the aspects and design variants.

BRIEF DESCRIPTION OF THE DRAWINGS

One preferred embodiment of the invention will now be described in greater detail on the basis of the appended diagrammatic drawing.

The FIGURE shows a fuel extraction system, a fuel tank apparatus and a part of a fuel cell system.

DETAILED DESCRIPTION OF THE PREFERRED EMBODIMENTS

The fuel cell system 1 which is shown in the single FIGURE (at least in sections) comprises a fuel cell 2 which is operated by way of gaseous fuel. The latter can be stored in a fuel tank 101 of the fuel tank apparatus 10. The fuel tank 101 contains gaseous fuel and liquid fuel (shown using crosshatched lines in the fuel tank 101).

In order to extract the fuel from the fuel tank 101, a fuel extraction system 100 comprises a conveying device 110 which is connected via a first line 105 to the interior of the fuel tank 101. The first line 105 preferably begins in an upper region of the fuel tank 101, in order to conduct only gaseous fuel and not liquid fuel from the fuel tank 101. The conveying device 110 can raise the gaseous fuel from a first pressure level which prevails in the fuel tank 101 to a second pressure level. For example, the conveying device 110 can raise the pressure of the gaseous fuel from approximately 2 bar to approximately 20 bar.

Subsequently, the gaseous fuel at the second pressure level is (buffer) stored in a buffer tank 120. The buffer tank 120 has a first outlet 121, to which a second line 125 is connected. Via the second line 125, a part of the fuel at the second pressure level is conducted to a pneumatic actuating device 131 of at least one valve 130. For this purpose, the second line 125 can comprise a main valve 126, the second line 125 branching off downstream of the main valve 126 and forming feed lines to the respective valve 130a, 130b, 130c. It goes without saying that further valves can also have a pneumatic actuating device 131 outside the fuel extraction system, which pneumatic actuating device 131 is actuated via the fuel from the second line 125. Each of the actuating devices 131 of the at least one valve 130 can be opened and closed exclusively via the fuel from the second line 125. As an alternative, the opening or closing can also take place automatically via a spring element or another mechanical actuator.

A third line 135 is connected to a second outlet 122 of the buffer tank 120. The third line 135 serves primarily to feed the fuel to a consumer, for example a fuel cell 2.

A first heat exchanger 140 can be provided in the third line 135, which first heat exchanger 140 is situated in a section 135a of the third line 135 through the interior of the fuel tank 101. By way of the first heat exchanger 140, thermal energy can be introduced into the liquid fuel in the fuel tank 101, as a result of which the fuel evaporates.

Furthermore, a second heat exchanger 150 can be provided in the third line 135, in which second heat exchanger 150 the fuel in the third line 135 serves as a heat sink for a coolant of a cooling circuit 155. The cooling circuit 155 can be used, for example, for cooling the fuel cell 2. As an alternative or in addition, a third heat exchanger 151 can be provided which couples the gaseous fuel in the first line 105 thermally to the gaseous fuel in the third line 135. As a result, the gaseous fuel in the first line 105 can be kept in the gaseous state, or residues of liquid fuel in the third heat exchanger 151 can be evaporated. The FIGURE shows the second heat exchanger 150 and the third heat exchanger 151 separately from one another. It goes without saying that this can be a combined heat exchanger which couples the fuel in the first line 105, the fuel in the third line 135 and the coolant of the cooling circuit 155 to one another thermally.

In order to regulate the quantity of the fuel to be evaporated in the fuel tank 101 by way of the first heat exchanger 140, a bypass line 136 is provided which, outside the fuel tank 101, bypasses the section 135a of the third line 135, and therefore bypasses the first heat exchanger 140. The bypass line branches off from the third line 135 upstream of the section 135a of the third line 135 in the interior of the fuel tank 101, and opens into the third line 135 again downstream of the section 135a. A second valve 130b of the at least one valve 130 which is arranged in the bypass line can regulate a throughflow quantity of the fuel through the bypass line 136, as a result of which a throughflow quantity of the fuel through the section 135a through the interior of the fuel tank 101 and the first heat exchanger 140 is also regulated.

A first valve 130a is provided in the third line 135 downstream of the section 135a and/or the bypass line 136. The fuel which is conducted as far as the first valve 130a is subsequently conducted through a further section 135b of the third line 135 to the consumer, for example a fuel cell 2. For this purpose, the first valve 130a regulates a throughflow quantity of the fuel through the further section 135b of the third line 135. The first valve 130a can also be a pressure reduction valve. For example, the gaseous fuel upstream of the first valve 130a can have approximately the second pressure level (with corresponding pressure losses by way of lines 135, 135a, 136, heat exchangers 140, 150, 151 and/or valves 130), whereas the first valve 130a regulates the gaseous fuel for the further section 135b of the third line 135 to the pressure level which is required by the consumer 2.

In addition to the fuel tank 101, the fuel tank apparatus 10 can also provide a protective tank 102. The latter serves primarily to collect fuel from the fuel tank 101, which fuel can escape from the latter. The protective tank 102 can collect the fuel even in the case of an undesired leak of the fuel tank 101. Fuel can be output safely from the protective tank 102 into the surroundings via corresponding safety lines 103, 104.

Furthermore, the fuel extraction system 100 can be arranged within the protective tank 102 (with the exception of the fuel tank 101). As a result, fuel which escapes from one of the components which are shown on the right-hand side next to the protective tank 102 in the FIGURE can be collected and discharged safely. As an alternative, the elements of the fuel extraction system 100, in which fuel at the second pressure level is contained, can be arranged in a separate protective vessel (shown using dashed lines). For the case where fuel at the second pressure level escapes, the fuel can be returned automatically into the fuel tank 101 via a corresponding feed line into the fuel tank 101, for example a feed line 138 for gaseous fuel or a separate feed line, since the fuel in the fuel tank 101 is stored at the first, lower pressure level. Merely by way of example, the buffer tank 120, the third line 135 (with the exception of the section 135a in the interior of the fuel tank 101), the bypass line 136, the second line 125 and the valves 126, 130 can be arranged within the protective vessel (shown using dashed lines).

Furthermore, the fuel tank apparatus 10 can provide a feed line 137 for liquid fuel for filling the fuel tank 101 with liquid fuel. A third valve 130c can be arranged in the feed line 137, which third valve 130c likewise has a pneumatic actuation means 131 which is supplied with and actuated by way of fuel at the second pressure level via the second line 125. The FIGURE additionally shows a feed line 138 for gaseous fuel. The feed line 138 can likewise be opened and closed via a corresponding valve (not shown separately).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A fuel extraction system for extracting a gaseous fuel from a fuel tank, comprising:
    a conveying device which is configured to the convey gaseous fuel and to bring the gaseous fuel from a first pressure level to a second pressure level;
    a first line which is configured to connect the conveying device fluidically to the interior of the fuel tank;
    a buffer tank which is configured to store the fuel at the second pressure level, and which has a first outlet and a second outlet;
    at least one valve with a pneumatic actuating device; and
    a second line which is connected to the first outlet of the buffer tank and is configured to conduct a part of the fuel at the second pressure level to the pneumatic actuating device of the at least one valve.

2. The fuel extraction system according to claim 1, the pneumatic actuating device of the at least one valve being configured to open and to close the valve exclusively by means of the gaseous fuel at the second pressure level.

3. The fuel extraction system according to claim 1, comprising, furthermore:
    a third line which is connected to the second outlet of the buffer tank and is configured to conduct the fuel at the second pressure level to a consumer,
        the third line having a section which leads through an interior of the fuel tank and which comprises a first heat exchanger for evaporating liquid fuel in the fuel tank.

4. The fuel extraction system according to claim 3, a first valve of the at least one valve being arranged in the third line downstream of the section through the interior of the fuel tank, and being configured to regulate a throughflow quantity of the fuel through the third line.

5. The fuel extraction system according to claim 3, comprising, furthermore:

a bypass line which, outside the fuel tank, bypasses the section of the third line through the interior of the fuel tank; and a second valve of the at least one valve which is arranged in the bypass line and is configured to regulate a throughflow quantity of the fuel through the bypass line.

6. The fuel extraction system according to claim 1, comprising, furthermore:

a second heat exchanger which is configured to utilize the gaseous fuel as a heat sink for a coolant of a cooling circuit.

7. The fuel extraction system according to claim 3, comprising, furthermore:

a third heat exchanger which is configured to couple the gaseous fuel in the first line thermally to the gaseous fuel in the third line.

8. The fuel extraction system according to claim 1, comprising, furthermore:

a main valve which is arranged in the second line and which is configured to regulate a throughflow quantity of the fuel at the second pressure level through the second line.

9. A fuel tank apparatus, comprising:

a fuel tank for storing a fuel in a liquid and gaseous state; and a fuel extraction system according to claim 1.

10. The fuel tank apparatus according to claim 9, comprising, furthermore:

a feed line into the fuel tank for filling the fuel tank with liquid fuel; and a third valve of the at least one valve which is arranged in the feed line and is configured to regulate a throughflow quantity of the fuel feed through the line.

11. A fuel cell system, comprising:

a fuel cell which is operated by way of gaseous fuel; and a fuel extraction system according to claim 1.

12. A fuel cell system, comprising:

a fuel cell which is operated by way of gaseous fuel; and a fuel tank apparatus according to claim 9.

* * * * *